Feb. 13, 1934.  H. E. BELL  1,946,728
WEATHER STRIPPING
Filed June 21, 1932   2 Sheets-Sheet 1
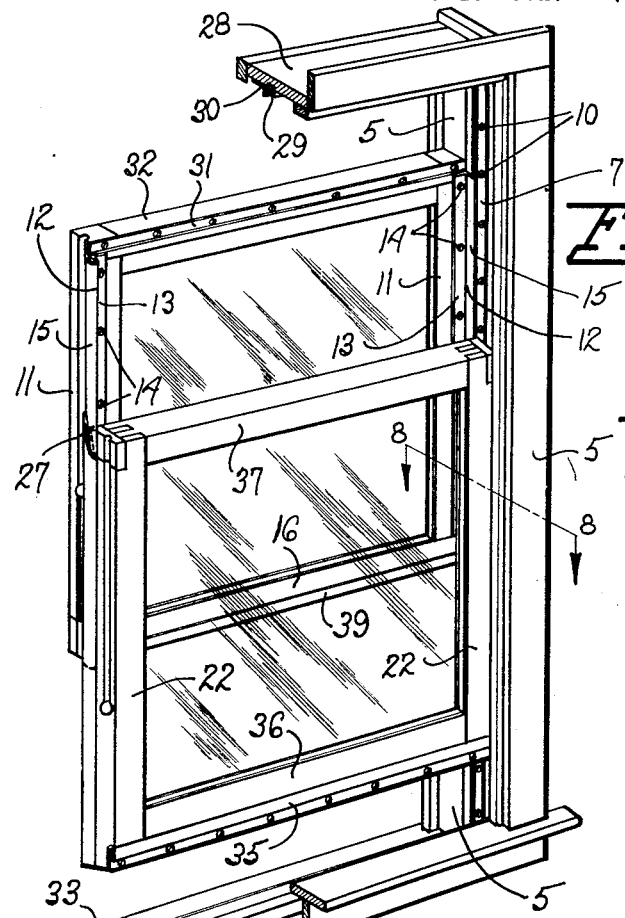
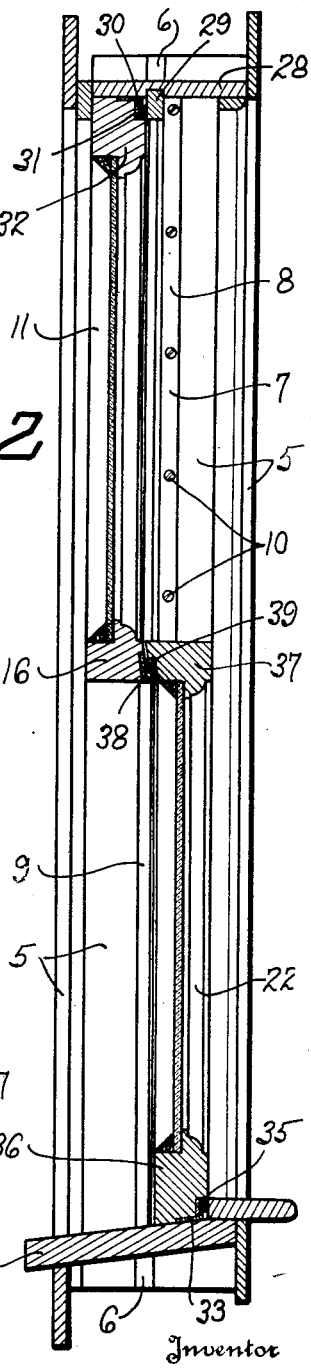
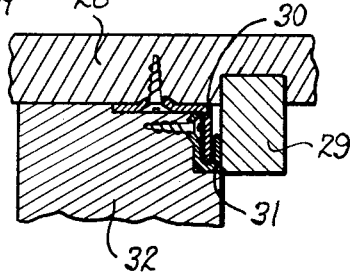
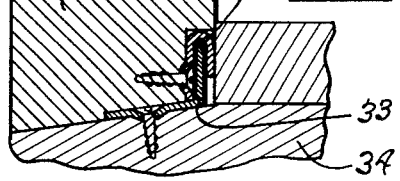
Inventor
Harold E. Bell
By Glenn L. Fish
Attorney

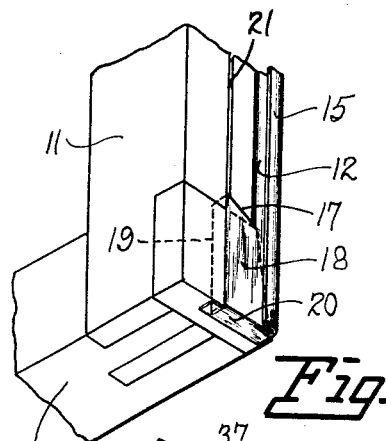
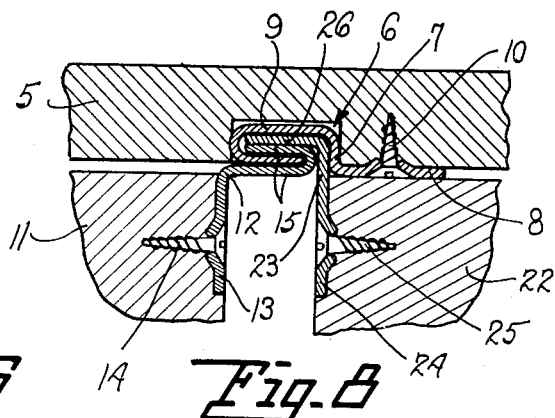
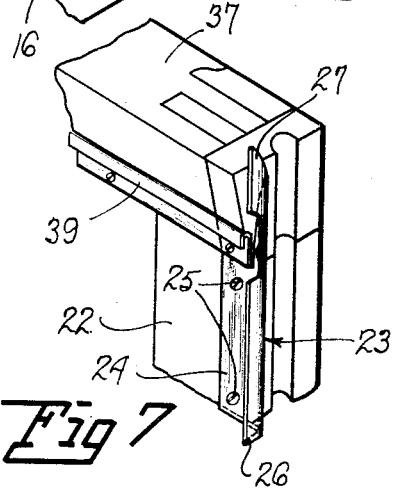
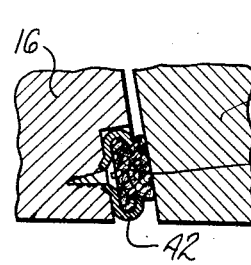
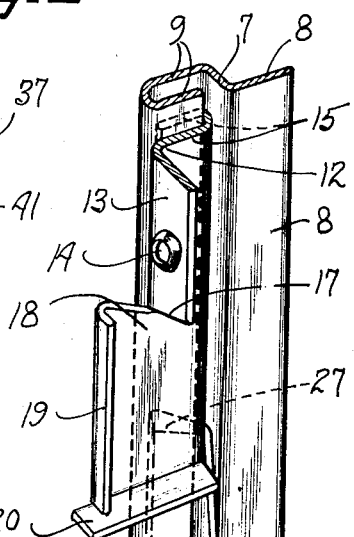
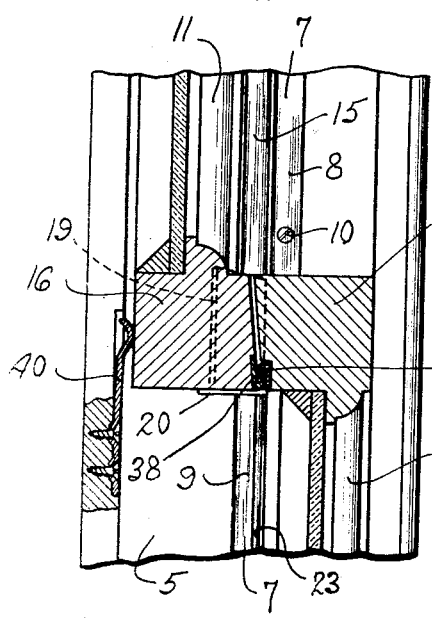

Patented Feb. 13, 1934

1,946,728

UNITED STATES PATENT OFFICE 1,946,728

WEATHER STRIPPING

Harold E. Bell, Spokane, Wash.

Application June 21, 1932. Serial No. 618,504

2 Claims. (Cl. 20—69)

My invention relates to weather stripping and is particularly adapted for use on windows of the double sash type. Certain objects of the invention are to provide weather stripping comprising hooked sheet metal stripping members secured to the side members of a window frame and adapted to slidably receive the flange portions of stripping members secured to the side frames of both the upper and lower sashes thus making a slidable weatherproof connection. Further objects are to provide interlocking stripping members for the upper frame of the top sash and the lintel of the window frame, interlocking stripping members for the lower frame member of the upper sash and the upper frame member of the lower sash, and interlocking stripping members for the lower frame member of the lower sash and the window sill, thus completing the sealing or weatherproofing of the window as a whole when the sashes are in the closed position. The weather stripping members are readily installed on both old and new windows, can be cut at any desired lengths, are comparatively inexpensive to install, are dust and weather proof, permanent and inconspicuous, and form an effective seal for the window.

With the above and other objects in view which will appear as the description proceeds, the invention consists of the novel construction, adaptation, combination and arrangement of parts hereinafter described and claimed. These objects are accomplished by devices illustrated in the accompanying drawings; wherein: Figure 1 is a general view in perspective and partly broken away of a window frame with an upper and a lower sash installed therein and showing the application of my weather proof stripping thereto; Fig. 2 is a view in vertical section of the same; Fig. 3 is an enlarged view in transverse vertical section showing the weather stripping arrangement at the top where the upper frame member of the upper sash engages the lintel of the window frame; Fig. 4 is a corresponding view showing the weather stripping arrangement at the middle where the lower frame member of the upper sash and the upper frame member of the lower sash come together when the sashes are closed; Fig. 5 is a corresponding view showing the weather stripping arrangement at the bottom where the lower frame member of the lower sash rests on the window sill; Fig. 6 is a fragmentary view in perspective showing the weather stripping arrangement at a lower corner of the upper sash; Fig. 7 is a corresponding view showing the arrangement at an upper corner of the lower sash; Fig. 8 is a detail view in horizontal section taken on a broken line 8—8 of Fig. 1; Fig. 9 is a detail view in transverse vertical section showing a modified form of stripping that may be used instead of that shown in Fig. 4; Fig. 10 is a detail view in perspective showing the arrangement of the weather stripping members for the sides of the frame and sashes; and Fig. 11 is a detail view in transverse vertical section showing the stripping arrangement where the upper and lower sashes come together in the closed position and showing a spring for retaining said sashes together.

Referring to the drawings throughout which like reference numerals indicate like parts and wherein the weather stripping arrangement for the sides of the window frame and sashes will first be described, the numeral 5 designates the jamb or upright side members of a window frame which members are centrally provided with a vertical groove or channel 6 extending the full height thereof. Referring particularly to Fig. 8, the stationary or window stripping members 7 comprise a flange portion 8 and a head portion 9. The said flange portion is secured to the frame jamb on either side by screws, as at 10, while the head portion is offset from the flange and is bent back upon itself leaving an opening between that is substantially twice as wide as the thickness of the material which is preferably sheet metal. The offset head portion is slightly wider than the width of the groove 6 and is forcibly sprung into said groove to form a tight connection. It will be understood that said stationary stripping members extend the full height of the frame and one is installed in either jamb thereof.

Again referring to Fig. 8, the side members 11 of the upper sash stripping members 12 comprise a flange portion 13, that is secured to the side members by screws 14, and a head portion 15. The head portion is formed by bending said stripping members at right angles to their flange portions and thence downwardly and backwardly upon themselves leaving an opening between that is substantially as wide as the thickness of the material and adapted to snugly and slidably receive the terminal part of the head portion of the member 7. In order to effectively seal the lower ends of the upper sash stripping members 12 against the weather where they join the beveled end portions of the lower transverse frame member designated by the numeral 16, I have cut the lower portions of said upper sash stripping flange portions 13 at 17 and bent them outwardly at 18 and then inwardly to form a flange 19. Said bent and flange portions are provided with a bottom 20 which fits up against the sash corner and the flange 19 fits into a kerf 21 in the side sash members 11 as clearly shown in Fig. 6 of the drawings.

The side frame members 22 of the lower sash are provided with lower sash stripping members 23. Said members are L-shaped and each comprises a flange portion 24 that is secured to the side frame members by screws at 25, and a projecting flange portion 26 which snugly and slidably fits into the head 9 of the stationary frame member 7 between the rear portion thereof and the terminal part of the upper sash stripping member 12 as clearly shown in Fig. 8. It will thus be seen that both the stripping members 12 and 23 are slidably arranged within the stripping member 7 and adapted to slide upon each other. The upper ends of the stripping members 23 are provided with a reduced extension 27 projecting above the top of the lower sash so that when both sashes are closed said extensions will continue to engage the stripping members 12 thus preventing disengagement and displacement of said members as will be understood.

In order to weatherproof the top of the window the lintel 28 of the window frame members 5, which is provided on its under side with the usual parting bead 29, has an L-shaped stripping member 30 which has one of its flanges secured thereto immediately to the rearward of the parting bead. A hooked or U-shaped stripping member 31 is secured to the top frame member 32 of the upper sash and is arranged to receive the downwardly projecting flange of the member 30 when the upper sash is closed as most clearly shown in Fig. 3. A similar arrangement is provided for sealing the bottom of the window and comprises an L-shaped stripping member 33 secured to the window sill 34. A hooked or U-shaped stripping member 35 is fixed to the lower portion of the lower sash bottom frame member 36 and is arranged to receive the upwardly projecting flange of the member 33 when the lower sash is closed as clearly shown in Fig. 5 of the drawings.

At the middle of the window where the lower transverse sash member 16 and the upper transverse sash member 37 come together when the sashes are closed, I have provided a hooked stripping member 38 secured to the lower inside edge portion of the member 16 and a corresponding hooked stripping member 39 secured to the lower outside portion of the member 37 as most clearly shown in Fig. 4. The opposing hooked ends of said stripping members catch upon each other when the sashes are closed thus providing a weather proof connection. As shown in Fig. 11, I have provided a flat spring 40 for the frame 5 and said spring bears against the sash member 16, when it is in the raised or closed position, thus causing said member to press inwardly against the sash member 37 and thus causing contact of the members and ensuring a weather proof connection. In Fig. 9 I have shown a modified form wherein a strip of felt 41 is clamped between a jaw stripping member 42 which is secured to the sash member 16. The felt engages the sash member 37 thus forming a snug connection as will be understood.

In the foregoing description it will be understood that the usual parting beads for the uprights 5 of the window frame are eliminated and the heads 9 of the stripping members 7 take their place. The grooves 6, which are originally provided for the usual wood parting beads, may be used in old frames after removing the parting beads, while in new frames said grooves must, of course, be cut therein. It will now be apparent that I have provided weather stripping for all movable members and connections of windows comprising overlapping and hooked portions adapted to slide upon and engage into each other and whereby a weather proof window as a whole is provided. Having thus described my invention, what I claim and desire to secure by Letters Patent of the United States is:—

1. A weather stripping comprising a stationary stripping member having a hooked head fixed into a groove on each side of the window frame, a stripping member secured to side members of the upper sash and having a hooked flange slidably disposed within the hooked head of the stationary stripping member, a stripping member secured to the side members of the lower sash and having a right angular flange that is also slidably disposed within the hooked head of the stationary stripping member and in slidable engagement with the stripping member that is secured to the frames of the upper sash, and said lower sash stripping members having an upwardly projecting extension engaging the upper sash stripping members whereby said stripping members are retained in proper engagement when the sashes are closed.

2. A weather stripping comprising a stationary stripping member having a hooked head fixed into a groove on each side of the window frame, a stripping member secured to the side members of the upper sash and having a hooked flange slidably disposed within the hooked head of the stationary stripping member, a stripping member secured to the side members of the lower sash and having a right angular flange that is also slidably disposed within the hooked head of the stationary stripping member, and said upper sash stripping members having outwardly bent lower end portions with bottoms that are adapted to fit onto the lower corners of the upper sash.

HAROLD E. BELL.